3,644,371
PROCESS FOR THE PRODUCTION OF
TETRAHYDROPYRIDINES
Hermann Oediger, Cologne-Flittard, and Rudolf Merten, Leverkusen, Germany, assignors to Farbenfabriken Bayer Aktiengesellschaft, Leverkusen, Germany
No Drawing. Filed Nov. 14, 1968, Ser. No. 775,899
Claims priority, application Germany, Sept. 18, 1967, F 54,331
Int. Cl. C07d 29/38
U.S. Cl. 260—290 H  1 Claim

ABSTRACT OF THE DISCLOSURE

Tetrahydropyridine of the formula

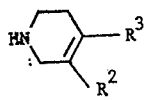

is produced by hydrolysing an N-carboalkoxytetrahydropyridine of the formula

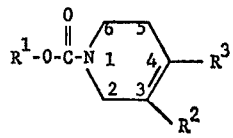

in which $R^1$ represents a lower alkyl radical, and $R^2$ and $R^3$ each represents hydrogen or a lower alkyl radical, but do not simultaneously represent hydrogen, by heating the N-carboalkoxytetrahydropyridine at a temperature of from about 200° C. to 300° C. in a pressure-tight vessel with at least the stoichiometrically necessary quantity of a solid anhydrous alkali metal hydroxide or alkaline earth metal oxide in the absence both of water and of organic solvents.

---

This invention relates to a process for the production of tetrahydropyridines by hydrolysing N-carboalkoxytetrahydropyridines in the absence of water and solvents.

It is known that N-carboalkoxytetrahydropyridines can be hydrolysed with excess alkali metal hydroxides in aqueous-alcoholic solution to form tetrahydropyridines, the reaction being carried out under pressure at elevated temperature [Angew. Chemie 74 (1962) page 866; Belgian patent specification No. 611,643]. See also U.S. Pat. 3,225,051, issued Dec. 21, 1965. The reaction products are recovered from the reaction solution by extraction with an organic solvent. This process involves losses with tetrahydropyridines that are highly soluble in water and, where purification is carried out by distillation, gives products which contain water through the formation of azeotropic mixtures. It is also possible to pre-purify the tetrahydropyridine obtained by extraction, by salt formation, for example with an inorganic acid such as hydrochloric acid, and to liberate the amine from the salt, for example with aqueous alkali metal hydroxides, and then to isolate it. Unfortunately, this process is complicated and also involves losses with tetrahydropyridines that are highly soluble in water.

It has now been found that tetrahydropyridines can readily be obtained in high yields by heating an N-carboalkoxytetrahydropyridine of the general formula

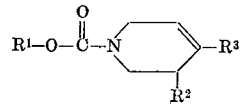

in which $R^1$ represents a lower alkyl radical, and $R^2$ and $R^3$ each represents hydrogen or a lower alkyl radical but do not simultaneously represent hydrogen, with at least the stoichiometrically necessary quantity of a solid anhydrous alkali metal hydroxide or alkaline earth metal oxide in a pressure-tight vessel at a temperature in the range from about 200 to about 300° C. in the absence both of water and of organic solvents.

This reaction is surprising, because the presence of a solvent containing hydroxly groups, such as water or an alcohol, is known to be necessary from the outset with compounds that are extremely difficult to hydrolyse, such as the N-carboalkoxytetrahydropyridines. Hitherto, it has been preferred to use high-boiling solvents containing hydroxyl groups such as glycol monoarlkyl ethers.

One major advantage of the hydrolysis process according to the present invention is that the tetrahydropyridines are very easy to isolate. The reaction products are recovered from the semi-solid, highly viscous reaction mass by direct vacuum distillation without any need for extraction, and may readily be separated from one another by simple distillation because no azeotropic mixtures are formed during distillation due to the absence of water. In contrast to conventional methods of working-up, the tetrahydropyridines formed may be isolated in highly pure form with hardly any losses in this way.

In addition, the progress of the reaction, for example in an autoclave, may readily be controlled because the starting material has a much lower vapour presence than the corresponding reaction products. Providing the hydrolysis temperature is kept constant, the reaction is over when there is no further increase in pressure.

Examples of suitable N-carboalkoxytetrahydropyridines include N-carboalkoxy-3-alkyl-, -4-alkyl- or 3,4-dialkyl-1,2,5,6-tetrahydropyridines (preferably with 1 to 3 carbon atoms in the alkyl radical), for example N-carbethoxy-4-methyl-1,2,5,6-tetrahydropyridine or N-carbomethoxy3,4-dimethyl-1,2,5,6-tetrahydropyridine. They may be prepared in known manner by cyclising 1,3-dienes with methylene-1,1-biscarbamic acid esters [Angew. Chemie 74 (1962) page 866].

Anhydrous, solid alkali metal hydroxides, for example, sodium hydroxide, potassium hydroxide, or caesium hydroxide in their commercial forms (e.g. powders, flakes or pellets), and also alkaline earth metal oxides, for example barium oxide, are suitable for the hydrolysis reaction.

It is preferred to react 1 mol of N-carboalkoxytetrahydropyridine with at least 2 mols and preferably with 3 to 4 mols of the particular alkali metal hydroxide (preferably KOH or NaOH) or alkaline earth metal oxide. It is also possible without any disadvantages to use an excess of the corresponding inorganic base.

The process is carried out at a temperature in the range from about 200° C. to about 300° C. and preferably at a temperature in the range from about 220° C. to about 250° C.

The final pressure that is obtained in the autoclave is naturally governed by the size of the gas space left after the autoclave has been loaded. For example, with a 2-litre-capacity autoclave filled with 1 kg. of starting material and 1 kg. of KOH powder at 230° C., it amounts to approximately four times the initial pressure prevailing at that temperature.

Furthermore, the products can be used for the production of very effective choleritica as described in the South African patent specifications 67/3,862 and 67/3,863, both patented on Feb. 28, 1968, and for the production of remedies against high blood pressure in correspondence with the German patent specification 1,206,902, published Dec. 16, 1965.

EXAMPLE 1000 parts by weight of N-carbethoxy-4-methyl-1,2,5,6-tetrahydropyridine are heated for 10 hours at 230° C. in an autoclave with 1000 parts by weight of anhydrous potassium hydroxide powder. After cooling, the reaction products are distilled off at reduced pressure (10 to 20 torr) and the tetrahydropyridine is recovered by distillation in a column at normal pressure.

Yield: 414 parts by weight of 4-methyl-1,2,5,6-tetrahydropyridine. B.P. 138–139° C./760 torr.

Another 30 parts by weight of the same tetrahydropyridine can be recovered from the distillation residue by vacuum distillation at 14 torr.

What is claimed is:

1. A process for the preparation of a tetrahydropyridine of the formula

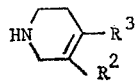

which comprises heating a compound of the formula

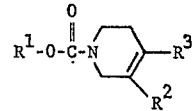

in which $R^1$ represents a lower alkyl radical, and $R^2$ and $R^3$ each represents hydrogen or a lower alkyl radical, but do not simultaneously represent hydrogen, at a temperature of from about 200° C. to 300° C. in a pressure-tight vessel with at least the stoichiometrically necessary quantity of a solid anhydrous alkali metal hydroxide or alkaline earth metal oxide in the absence both of water and of organic solvents.

References Cited

UNITED STATES PATENTS 3,225,051   12/1965   Merten _____ 260—290

HENRY R. JILES, Primary Examiner

H. I. MOATZ, Assistant Examiner

U.S. Cl. X.R.

260—295 CA; 424—263